Figure 1:
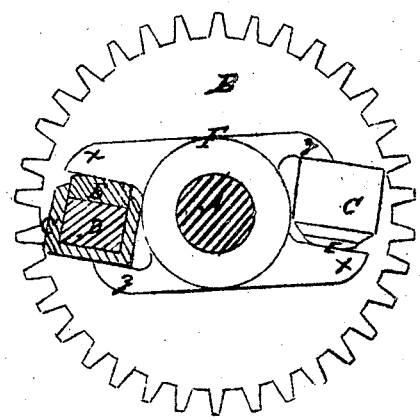
Figure 2:
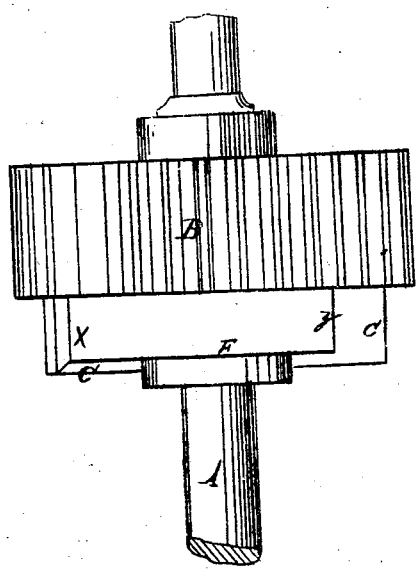

*Thaddeus L. Clark's*

*Spring Equalizer for Mill Spindles.*

No. 75124

PATENTED
MAR 3 1868

Witnesses:

Inventor:
Thaddeus L. Clark
per
Alexander Mason
Atty.

United States Patent Office.

THADDEUS L. CLARK, OF MOUNT VERNON, OHIO.

Letters Patent No. 75,124, dated March 3, 1868.

IMPROVED SPRING-EQUALIZER FOR MILL-SPINDLES.

*The Schedule referred to in these Letters Patent and making part of the same.*

TO ALL WHOM IT MAY CONCERN:

Be it known that I, THADDEUS L. CLARK, of Mount Vernon, in the county of Knox, and in the State of Ohio, have invented certain new and useful Improvements in Spring-Equalizer for Mill-Spindles; and do hereby declare that the following is a full, clear, and exact description thereof, reference being had to the accompanying drawings, and the letters of reference marked thereon.

In the annexed drawings, making a part of this specification, A represents a spindle or shaft for mill-stones, and B represents the pinion, adjusted loosely thereon. The pinion B has cast or secured on its upper side cups, or boxes C C, in which are placed rubber or elastic springs D D, so that they just fit therein. Over the springs D D, to hold them in place, are adjusted followers E E, which just fit in the cups or boxes C C, and which have their outside face slightly bevelled. F represents a driver, keyed on the shaft A, just above the pinion, and provided with jaws z z and x x, which embrace or fit over and against the back side of the cups C C and the followers E E respectively. The jaws x x, pressing against the followers E E, which, in turn, rest against the rubber springs D D in the cups C C, which are secured to the pinion B, give motion to said pinion, and the springs D D prevent the backlash created or produced by any unsteady motion or resistance of or to the millstone attached to the shaft A. The jaws z z are for the purpose of holding the opposite jaws x x against the face of the followers E, to prevent them from falling out of the cups C C.

Having thus fully described my invention, what I claim as new, and desire to secure by Letters Patent, is—

The oblong driver F, with a short and long jaw, z x, at each end, within which are placed the boxes C C, bevelled at their tops, and provided with rubber fillings D D and followers E E, when used in combination with the spindle A and pinion B, substantially as and for the purposes set forth.

In testimony that I claim the foregoing, I have hereunto set my hand, this 10th day of January, 1868.

T. L. CLARK.

Witnesses:
  N. GUERNSEY,
  JULIA E. TURNER.